US007051277B2

(12) United States Patent
Kephart et al.

(10) Patent No.: US 7,051,277 B2
(45) Date of Patent: May 23, 2006

(54) AUTOMATED ASSISTANT FOR ORGANIZING ELECTRONIC DOCUMENTS

(75) Inventors: Jeffrey Owen Kephart, Cortlandt Manor, NY (US); Richard Brian Segal, Ossining, NY (US); Steve Richard White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 09/061,706

(22) Filed: Apr. 17, 1998

(65) Prior Publication Data

US 2001/0042087 A1 Nov. 15, 2001

(51) Int. Cl.
*G06F 15/00* (2006.01)
*G06F 17/21* (2006.01)

(52) U.S. Cl. .................. 715/530; 715/531; 707/1; 707/3; 707/104; 706/45

(58) Field of Classification Search .............. 707/1, 707/3, 104, 102, 5; 715/530, 531; 706/20, 706/45; 345/354; 709/219
See application file for complete search history.

(56) References Cited

U.S. PATENT DOCUMENTS

| | | | | |
|---|---|---|---|---|
| 5,544,360 A | * | 8/1996 | Lewak et al. ................ 707/1 |
| 5,642,288 A | | 6/1997 | Leung et al. .............. 700/223 |
| 5,751,287 A | | 5/1998 | Hahn et al. ................ 345/351 |
| 5,772,446 A | * | 6/1998 | Rosen ...................... 434/307 R |
| 5,867,799 A | * | 2/1999 | Lang et al. .................. 707/1 |
| 5,877,963 A | | 3/1999 | Leung et al. .............. 700/223 |
| 5,895,470 A | * | 4/1999 | Pirolli et al. .............. 707/102 |
| 5,899,995 A | * | 5/1999 | Millier et al. .............. 707/102 |
| 5,969,720 A | * | 10/1999 | Lisle et al. ................ 345/351 |
| 6,028,605 A | * | 2/2000 | Conrad et al. ............. 345/354 |
| 6,029,195 A | * | 2/2000 | Herz ....................... 709/219 |
| 6,047,277 A | * | 4/2000 | Parry et al. ................ 706/20 |
| 6,182,059 B1 | * | 1/2001 | Angotti et al. ............. 706/45 |
| 6,182,066 B1 | * | 1/2001 | Marques ................... 707/5 |
| 6,295,543 B1 | * | 9/2001 | Block et al. ............... 707/530 |

OTHER PUBLICATIONS

Warren Ernst, Using Netscape, Que Corporation, pp. 54-55, 66-67 1995.*
Dobrica, Savic, Automatic classification of office documents: Review of available methods and techniques, ARMA Records Management Quarterly, Prairie Village, Oct./1995, vol. 29, Issue 4, pp. 3-34.*
G. Salton and M. J. McGill, "Introduction to Modern Information Retrieval", McGraw-Hill Book Company, pp. 52-448, 1983.
W. W. Cohen, "Learning Rules that Classify E-Mail", 8 pages, AT&T Laboratories, Murray Hill, NJ 07974, wcohen@research.att.com.

(Continued)

*Primary Examiner*—William Bashore
(74) *Attorney, Agent, or Firm*—Frank V. DeRosa; F.Chau & Associates,LLC

(57) ABSTRACT

A method of assisting a user with the task of categorizing a received electronic document into a collection includes the steps of classifying the document to obtain one or more most likely categorical labels; displaying, to the user, a representation of the one or more most likely categorical labels; receiving data, from the user, representative of a selected categorical label; and labeling the document within the collection with the selected categorical label. The electronic document can include an electronic mail message, a web page bookmark, an audio file or a video file.

53 Claims, 12 Drawing Sheets

OTHER PUBLICATIONS

T. R. Payne and P. Edwards, "Interface Agents that Learn: An Investigation of Learning Issues in a Mail Agent Interface", Applied Artificial Intelligence, 11:1-32, 1997.

Pattie Maes, "Agents that Reduce Work and Information Overload", Communications of the ACM, Jul. 1994/vol. 37, No. 7, pp. 31-40.

* cited by examiner

Incremental Learning Update

AUTOMATED ASSISTANT FOR ORGANIZING ELECTRONIC DOCUMENTS

FIELD OF THE INVENTION

This invention relates generally to software applications that manage electronic documents such as electronic mail, articles from news groups, articles from electronic news services, web pages or non-textual electronic documents such as images, video clips and audio clips.

BACKGROUND OF THE INVENTION

Numerous software applications permit users to receive and/or read electronic documents of various types. Lotus Notes, cc:Mail, Eudora, Netscape Messenger and Xmh are just a few of the many applications that handle electronic mail. Other applications, such as Xrn and GNUS, are specifically tailored to news groups on UseNet. Yet another set of applications, such as Netscape Navigator and Microsoft Internet Explorer, allows the reader to access and view web pages (documents that are distributed throughout the Internet and made available via the World Wide Web).

A useful feature shared by many of these applications is the ability to store a given document (or pointer to a document) and associate that document (or pointer) with one or more categorical labels. When the user wishes to view a document, the user can supply one or more of the labels to the application, thereby improving the speed and efficiency of locating it within the collection of documents.

Applications that manage electronic mail, electronic news items, web pages or other forms of electronic documents use a variety of methods for storing, labeling and retrieving documents. For example, the mail application Xmh stores each document as a separate file in the file system of the computer or network on which Xmh is running. Each document is assigned a single label, and all documents with the same label are stored in the same directory. The name of the label and the name of the directory in which documents with that label are stored are typically closely associated. For example, all documents labeled "administrivia" might be stored in the directory "/u/kephart/Mail/administrivia." If the user later wishes to find mail that he received a few months ago having to do with a lab safety check, he might click the button that represents the "administrivia" folder and either visually inspect the messages in that folder or ask Xmh to do a keyword search that is confined to the "administrivia" folder.

An alternative to storing each document as a separate file in a categorically labeled directory is to store each electronic document, along with one or more associated labels, in a database. For example, Lotus Notes employs this approach. Furthermore, web browsers, such as Netscape, permit users to maintain a collection of bookmarks (pointers to remotely stored web pages) that can be organized into folders. Netscape keeps information on bookmarks and their grouping into folders in a specially formatted file.

From the user's perspective, the act of storing, labeling and retrieving documents depends very little on such implementation details. Applications typically combine the steps of labeling and storing documents by offering the user a (usually alphabetized) menu of all of the labels that currently exist. Typically, the user selects one or more labels and then signals to the application (e.g., by clicking a button) that it can go ahead and store the document (or the document pointer) with the selected labels. Facilities for choosing and dynamically updating a set of labels meaningful to an individual user are usually provided.

A problem often encountered in electronic mail readers and other applications that manage electronic documents is that the list of possible labels may be several dozen or more, and consequently, it may take a user an appreciable amount of time (e.g., a fraction of a minute) to choose the most appropriate label or labels. The prospect of taking this time, along with the cognitive burden placed on the user, can discourage the user from labeling the document at all. The result is an undifferentiated mass of documents that can be difficult to navigate.

One attempt to address this issue in the electronic mail domain, Maxims, has been proposed and implemented by Maes et al., Agents That Reduce Work and Information Overload, *Communications of the ACM,* 37(7):31–40, July 1994. An individual user's Maxims agent continually monitors each interaction between that user and the Eudora mail application, and stores a record of each such interaction as a situation-action pair. It uses memory-based reasoning to anticipate a user's actions, i.e. it searches for close matches between the current situation and previously encountered situations, and uses the actions associated with past similar situations to predict what action the user is likely to take. Given this prediction, Maxims either carries out the predicted action automatically or provides a shortcut to the user that facilitates that action.

There are several drawbacks to the approach taken by Maxims. First, as noted by Maes et al., it can take some time for Maxims to gain enough experience to be useful. Maes et al. address this problem by allowing a newly instantiated agent to learn from more established ones. However, because categorization schemes and labels are very much an individual matter, one personalized e-mail agent cannot accurately teach another personalized e-mail agent about categorization. A second problem is that this approach requires the agent to be active and vigilant at all times to record every action taken by the user. Constant vigilance requires tight integration between the agent and the mail application, and therefore increases the difficulty of incorporating mail categorization into existing mail applications. A third problem is that the route by which a mail item becomes associated with a label may be indirect. For example, suppose a message M is initially filed under category C1 and then, one month later, it is moved to category C2. This would generate two situation-action pairs: M being moved from the Inbox to C1, and later M being moved from C1 to C2. While the net effect is that M has been placed in C2, the two situation-action pairs learned by Maxims cause it to predict that messages like M should first be placed in C1 and then sometime later be moved to C2. At best, this is inefficient and, at worst, it could decrease classification accuracy because the movement of M to C2 requires two separate predictions to be made accurately. The classifier would be more efficient and accurate if the classifier simply learned that M should be moved to C2. A fourth problem that could be acute for mail systems that store a user's mail database remotely on a server is that it may be inefficient to continually monitor actions on a client and report them back to the server. Workarounds for this are likely to be complex. A fifth problem is that the learning step of this approach involves periodic analysis of the entire body of situation features and actions to find correlations that are used as weights in the distance metric used to gauge the similarity between one situation and another. As the agent grows in experience, so does the amount of time required for the learning step. Because of the large amount of time required for the learning phase, Maes et al. suggest that learning be performed only once a day. As a result, the Maxims classifier can be a full day out of sync with the user's most recent patterns of placing messages in folders.

Payne et al., Interface Agents That Learn: An Investigation of Learning Issues in a Mail Agent Interface, *Applied Artificial Intelligence,* 11:1–32, 1997, describe an electronic mail categorization system very similar to that of Maes et al. Their method also requires that the user's actions be monitored on a continual basis. Furthermore, although they allow for to the possibility of incremental learning, they do not address the issue that the classifier cannot perform well until the classifier has seen the user categorize a large number of messages.

Cohen, Learning Rules That Classify e-mail, *In Proceedings of the* 1996 *AAAI Spring Symposium on Machine Learning and Information Access,* AAAI Press, 1996,compares the relative merits of two procedures for text classification. The comparisons are made using mail messages that have been previously categorized into folders using a technique similar to that disclosed hereinbelow to bootstrap a text classifier to perform well on the first messages seen by the classifier. However, the emphasis of his work is on comparing the performance of the two methods. Cohen does not discuss the relevance of previously categorized messages for bootstrapping a mail categorizer or similar application.

Conventionally, text classifiers learn to predict the category of a document by training on a corpus of previously labeled documents. Text classifiers make their predictions by comparing the frequency of tokens within a document to the average frequency of tokens in documents appearing in each category. A token is any semantically meaningful sequence of characters appearing in the document, such as a word, multi-word phrase, number, date or abbreviation. For example, the text "The Civil War ended in 1865" might be tokenized into the token set {"The", "Civil War", "ended", "in", "1865" }. Note that "Civil War" is interpreted here as a single token. The art of tokenization, as described in Salton et al., *Introduction to Modern Information Retrieval,* McGraw-Hill Book Company, 1983, is well known to those in the skilled in the art.

As discussed by Salton et al., direct comparison of the document's token frequencies with the token frequencies of each category can lead to highly inaccurate categorization because it tends to over-emphasize frequently occurring words such as "the" and "about." This problem is typically avoided by first converting the category token frequencies into category token weights that de-emphasize common words using the Term Frequency-Inverse Document Frequency (TF-IDF) principle. The TF-IDF weight for a token in a specific category increases with the frequency of that token among documents known to belong to the category and decreases with the frequency of that token within the entire collection of documents. There are many different TF-IDF weighting schemes. Salton et al. describe several weighting schemes and their implementations.

A document is classified by computing the similarity between the document token frequencies and the category token weights. The document is assigned the category labels for the most similar category or categories. Numerous similarity metrics are used in practice. Most treat the document token frequencies and the category token weights as a vector and compute some variation on the cosine of the angle between the two vectors. Salton et al. describe several similarity metrics and their implementations.

The complete procedure for training and using a standard text classifier is as follows. The classifier is first trained on a corpus of previously labeled documents. The training consists of tallying the frequencies of each token within each category, using this information to compute each token's weight within each category, and storing the computed weights in a database for later retrieval. Classification consists of computing the document token frequencies, retrieving the category weights of each token appearing in the document and using the similarity measure to compute the similarity between the document's token frequencies and each category's token weights. The classifier predicts the categories with the largest similarity.

The standard algorithm works well when the corpus used for training is static. A problem occurs if the training corpus ever changes due to addition, removal or re-categorization of a document. Because of the nature of the weight computation, adding or removing a single document affects the weights of every token in every category. As a result, the entire token weight database must be recomputed whenever the training corpus changes. This is unacceptable for organizing electronic mail because messages are continually being added and removed from folders.

Therefore, there is a need for an automated method for assisting a user with the task of using labels to organize electronic documents, without requiring continual monitoring of the user's actions or excessive amounts of computation devoted to learning the user's categorization preferences.

Also, there is a need for an automated method of assisting a user with organizing electronic documents using a text classifier algorithm having flexibility so that the normal additions, deletions and re-categorization of documents do not require unnecessary weight recomputation within the system.

Finally, there is a need for an automated method of assisting the user with organizing documents that, when first installed, uses information about documents that have been labeled previously by other means to produce a classifier, thus reducing or eliminating the amount of time required to train the automated method to categorize documents accurately.

SUMMARY OF THE INVENTION

The present invention is a method for assisting a user with the task of identifying and carrying out an appropriate labeling of an electronic document such as electronic mail, a news group article, web pages or non-textual electronic documents such as images, video clips and audio clips.

The method of the present invention includes the steps of training a text classifier on the user's existing labeled collection of documents, running the classifier on newly received documents, using the classification results to identify the most likely labels and presenting the set of possible labels to the user in a way that accentuates the most likely labels. The method further includes the step of updating the classifier as documents continue to be stored and labeled.

In one embodiment of the invention, the method is imbedded in an electronic mail application and assists users in organizing their mail in separate folders. In a second embodiment, the method is imbedded in a Web browser for the purpose of assisting users in organizing their bookmarks (pointers to web pages).

Specifically, a method of assisting a user with the task of categorizing a received electronic document into a collection is provided including the steps of classifying the document to obtain one or more most likely categorical labels, displaying, to the user, a representation of the one or more most likely categorical labels, receiving data, from the user, representative of one or more selected categorical labels and labeling the document within the collection with the one or more selected categorical labels.

Preferably, the method includes the step of re-training a classifier incrementally to adapt to modifications of the collection. In addition, the method preferably includes the step of training the classifier from scratch with a pre-existing collection of categorized documents.

BRIEF DESCRIPTION OF THE DRAWING

These and other features of the present invention will become apparent from the accompanying detailed description and drawings, wherein.

DETAILED DESCRIPTION OF THE PREFERRED EMBODIMENT

Figure 1:
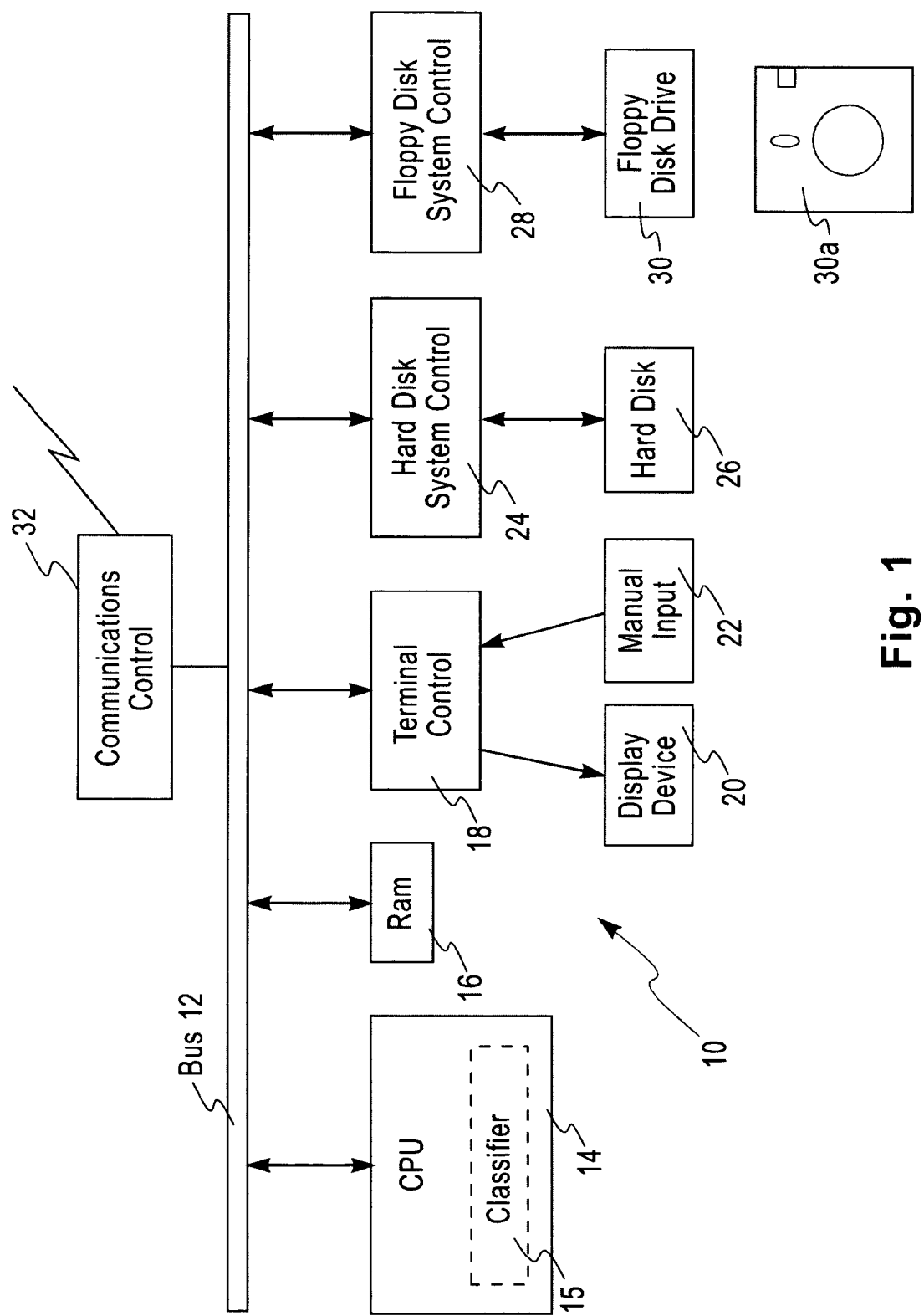
FIG. 1 is a block diagram of a data processing system on which the present invention can be implemented.

FIG. 1 is a block diagram of a data processing system 10 that is suitable for practicing the teaching of the present invention. A bus 12 is comprised of a plurality of signal lines for conveying addresses, data and controls between a Central Processing Unit 14 and a number of other system bus units. A RAM 16 is coupled to the system bus 12 and provides program instruction storage and working memory of the CPU 14. A terminal control subsystem 18 is coupled to the system bus 14 and provides outputs to a display device 20, typically a CRT monitor, and receives inputs from a manual input device 22, typically a keyboard. Manual input may also be provided from a pointing device, such as a mouse. A hard disk control subsystem 24 bidirectionally couples a rotating fixed disk, or hard disk 26, to the system bus 12. The control 24 and hard disk 26 provide mass storage for CPU instructions and data. A floppy disk control subsystem 28, which along with floppy disk drives 30 is useful as an input means in the transfer of computer files from a floppy diskette 30a to system memory, bidirectionally couples one or more of the floppy disk drives 30 to the system bus 12. Also, other storage systems such as compact disk (CD) (not shown) can be included. Finally, a communications controller subsystem 32 provides networking capabilities for the data processing system 10.

The components illustrated in FIG. 1 may be embodied within a personal computer, a portable computer, a workstation, a minicomputer or a supercomputer. As such, the details of the physical embodiment of the data processing system 10, such as the structure of the bus 12 or the number of CPUs 14 that are coupled to the bus, is not crucial to the operation of the invention, and is not described in further detail hereinbelow.

One embodiment of the present invention, referred to hereinbelow as "MailCat," augments Lotus Notes, a commercially available groupware product that supports electronic mail. MailCat uses a text classifier to assist the user with categorizing mail, and continually updates the text classifier to maintain an accurate prediction of the user's likely categorization choices.

All electronic messages received by Notes are stored in a database. The database is organized into a hierarchy of folders. Initially, when a message is first received, it is placed in a special folder called the Inbox. After the message has arrived in the Inbox, the user can move the message into any folder. The folders provide a mechanism for categorizing messages. For instance, the user may use the folder "Baseball" to store all messages related to the game of baseball.

Notes allows users to categorize messages using the "File" button. When the "File" button is pressed while the user is viewing a mail message, a dialog box entitled "Move To Folder" is displayed to the user, and the user can select from it a folder in which to place the message. It generally takes a small but significant amount of time and mental effort to scroll through the list of folders, trying to determine the most appropriate folder for the message.

Figure 2:
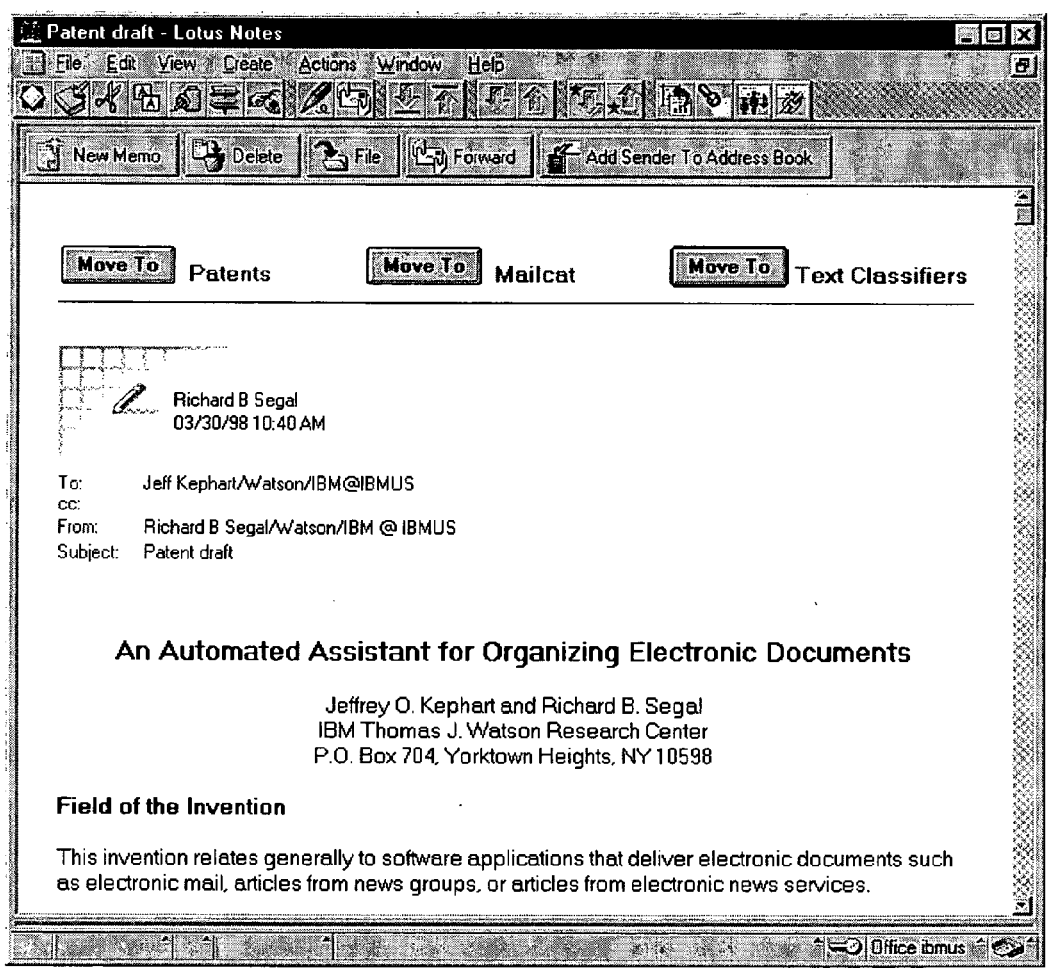
FIG. 2 shows the user interface of one embodiment of the present invention, the Mailcat interface with Lotus Notes.

MailCat simplifies the task of moving messages to folders by placing a number (e.g., three) of special "Move To" buttons (categorization shortcuts) above each message displayed on the display device 20, as illustrated in FIG. 2. The leftmost button 210 is labeled with "Patents," which is, preferably, the name of the folder that is deemed by the text classifier to be most likely to be selected by the user as the destination for the message. Preferably, the other two buttons 220 and 230 are labeled, respectively, with the names of folders that are deemed second ("Mailcat") and third ("Text Classifiers") most likely to be selected by the user. When one of the three buttons is selected by the manual input device 22, e.g., clicked, the message is immediately moved to the associated folder name. If the user decides that none of the folders offered by the three special buttons are appropriate, she can simply select the "File" button 240 and use the traditional "Move To Folder" dialog box (not shown) which lists all of the user's folders. Thus, even when the classifier fails to anticipate the correct folder, there is no penalty other than the small loss of screen space devoted to the buttons. When the message is moved from the Inbox to another folder, various actions are taken to support incremental learning based on the new information derived from the fact that the message has been placed in a particular folder. A more detailed description of MailCat's usage of the text classifier is provided hereinbelow.

In order to predict the most likely destination folder or folders for a particular message, the text classifier must be trained. As is generally known in the field, a text classifier is trained on a corpus of documents that have been classified by humans. Often, the development of a labeled corpus involves a long, laborious effort by a human expert. Fortunately, in an electronic mail application, the corpus is ready-made: the documents are the individual mail messages, and the label for each is simply the name of the folder into which it has been placed.

In the present invention, training may take place in a number of ways at various times. If the automated categorization capability of the MailCat embodiment is installed after Lotus Notes has already been in use, most likely there will be a pre-existing mail database containing folders into which mail messages have been placed by the user (using the standard "File" button). In this situation, an initial classifier can be trained directly from the existing database. While MailCat is in use, further training can be performed by an incremental learning procedure which can be run in either a "lazy" or "instant" mode. Training from scratch, lazy incremental learning and instant incremental learning are described hereinbelow.

Using the Classifier

According to this embodiment of the present invention, when new mail arrives in a user's Inbox, a sequence of events ensues in which the message is classified, appropriate buttons are added to displayed messages and the mail is quickly filed in response to the user's selection. This sequence of events is referred to as the MailCat_Classify procedure.

MailCat_Classify may be triggered in a number of different ways. The simplest approach is to invoke MailCat_Classify whenever a new message arrives in the Inbox. However, with this approach, there is a delay between when the message is classified and when it is viewed. If incremental learning has updated the classifier during the interim, the buttons displayed with the message upon viewing might not represent the classifier's latest predictions. An alternative is to run MailCat_Classify on a message just at the moment when the user indicates a desire to display that message. This method improves the accuracy of the buttons added to the classifier, but introduces a slight delay in displaying the more up-to-date message screen. A third possibility is to offer the user a button that, when clicked, invokes MailCat_Classify on one, some or all of the messages in the Inbox. This method for triggering MailCat_Classify gives the user manual control over the tradeoff between computational cost and currentness of the buttons.

Figure 3:
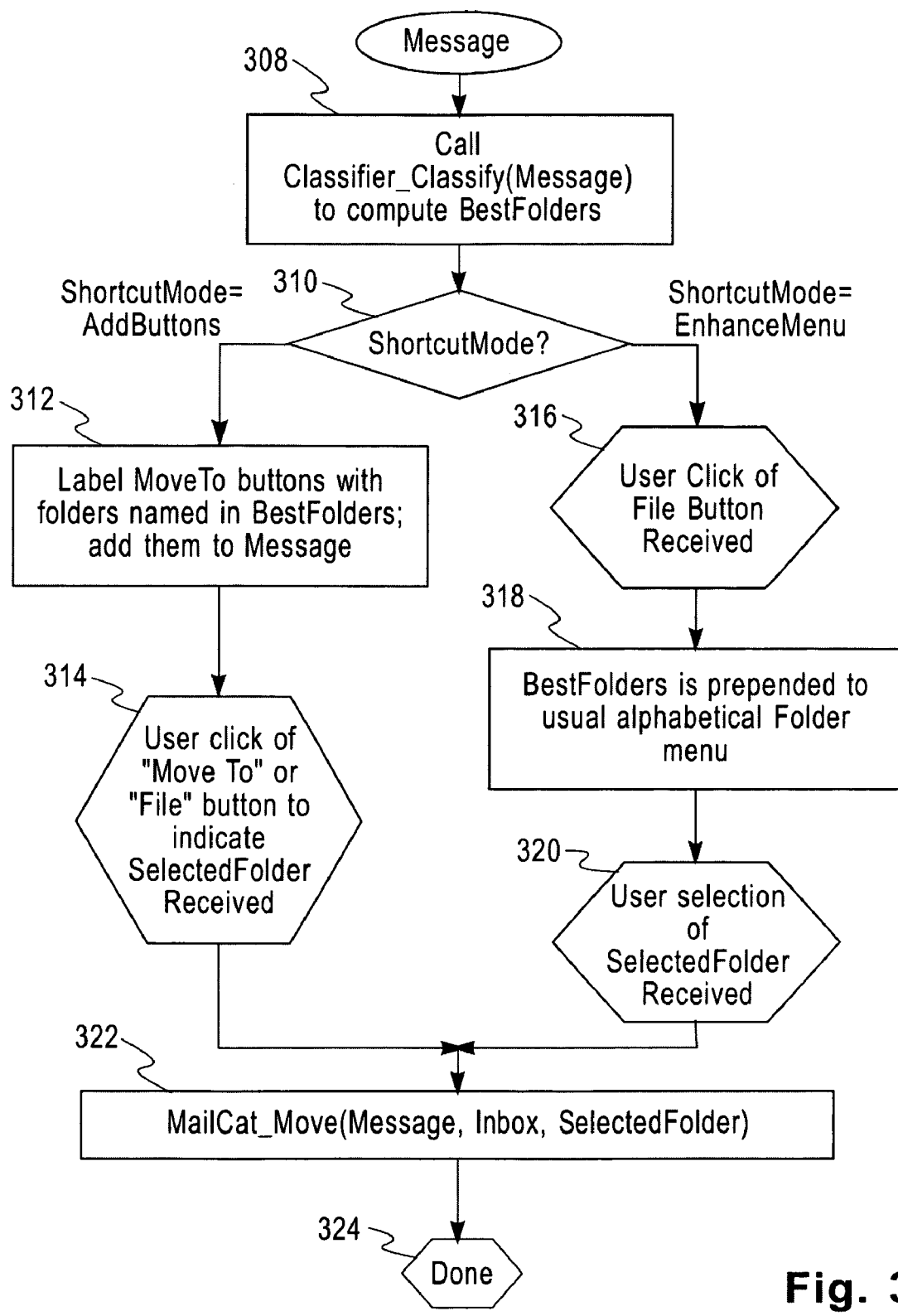
FIG. 3 is a flow diagram of the MailCat_Classify procedure of one embodiment of the present invention.

The operation of MailCat_Classify is illustrated in FIG. 3. MailCat_Classify takes as input a Message in any of the three approaches described hereinabove. First, at step 308, a core classifier procedure Classifier_Classify is applied to the Message. As is described in greater detail hereinbelow, Classifier_Classify takes the Message as its input and produces, as output, a list of one or more categorical labels or folder names, "BestFolders." Preferably, graphical representations or categorization shortcuts of the folder names in BestFolders are derived sometime between the time the document is received and the time the document is displayed to the user. These representations, e.g. buttons, are preferably ordered such that the first element is the name of the folder deemed by the classifier to be the most likely destination for the input Message, the second element is the second most likely destination folder, etc. The maximal number of buttons that should be displayed, "MaxButtons," is an integer, set either to some chosen default value or set by the user (most likely via a graphical user interface). For example, in FIG. 2, MaxButtons is set to 3, and Classifier_Classify has returned the ordered list consisting of BestFolders={Patents, Mailcat, Text Classifiers}.

At step 310, the value of a flag "ShortcutMode" is examined. If the value of ShortcutMode is equal to "AddButtons," this is interpreted as meaning that the folders listed in BestFolders are to be presented to the user in the form of special "Move To" buttons as illustrated in FIG. 2. In this case, the objects corresponding to the buttons are derived, even if their display is delayed. If the value of the flag is equal to "EnhanceMenu," then in lieu of buttons the user will be provided with an enhanced version of the "Move To Folder" menu, in which the ordered set of folders BestFolders is prepended to the standard alphabetic ordering of all of the folders in the database.

If the value of ShortcutMode is AddButtons, then the method continues in step 312. At step 312, special "Move To" buttons are included at the top of the message, so that if and when that message is displayed to the user, it will be similar in form to what is illustrated in FIG. 2. The "Move To" button labels are the folder names in BestFolders, preferably placed in order of their appearance in BestFolders from left to right at the top of the message. After some period of time, when the user has displayed and read the message, the user may elect to click on one of the "Move To" buttons to choose a "SelectedFolder" into which she desires the message to be placed. If none of the "Move To" buttons offer the desired category, the user may choose SelectedFolder by using the standard "File" button. Therefore, in step 314, data is received indicating that the user chose a SelectedFolder.

If the value of ShortcutMode is EnhanceMenu, the method continues from step 310 to step 316. At step 316, the reader reads the message and data is received indicating that the user invoked the standard "Move To Folder" menu by clicking on the "File" button. At step 318, the list BestFolders is prepended to the traditional alphabetic listing of folder names. This enables the user to quickly choose a SelectedFolder, causing data indicative of the selection to be received at step 320.

Regardless of the value of ShortcutMode, the two alternative paths join back together at step 322, where the function MailCat_Move (detailed hereinbelow) is called. MailCat_Move moves the message from the Inbox to the SelectedFolder and updates the classifier with the information that the Message is now in SelectedFolder. MailCat_Classify then terminates at step 324.

Training the Classifier

Although not directly observable by the user, MailCat continually trains and re-trains the classifier in an attempt to keep up with dynamic changes in the user's mail database as mail is received, deleted and moved. However, an additional step of training the classifier from scratch is preferable when an automated assistant according to the present invention is instantiated.

Training from Scratch

Figure 4:
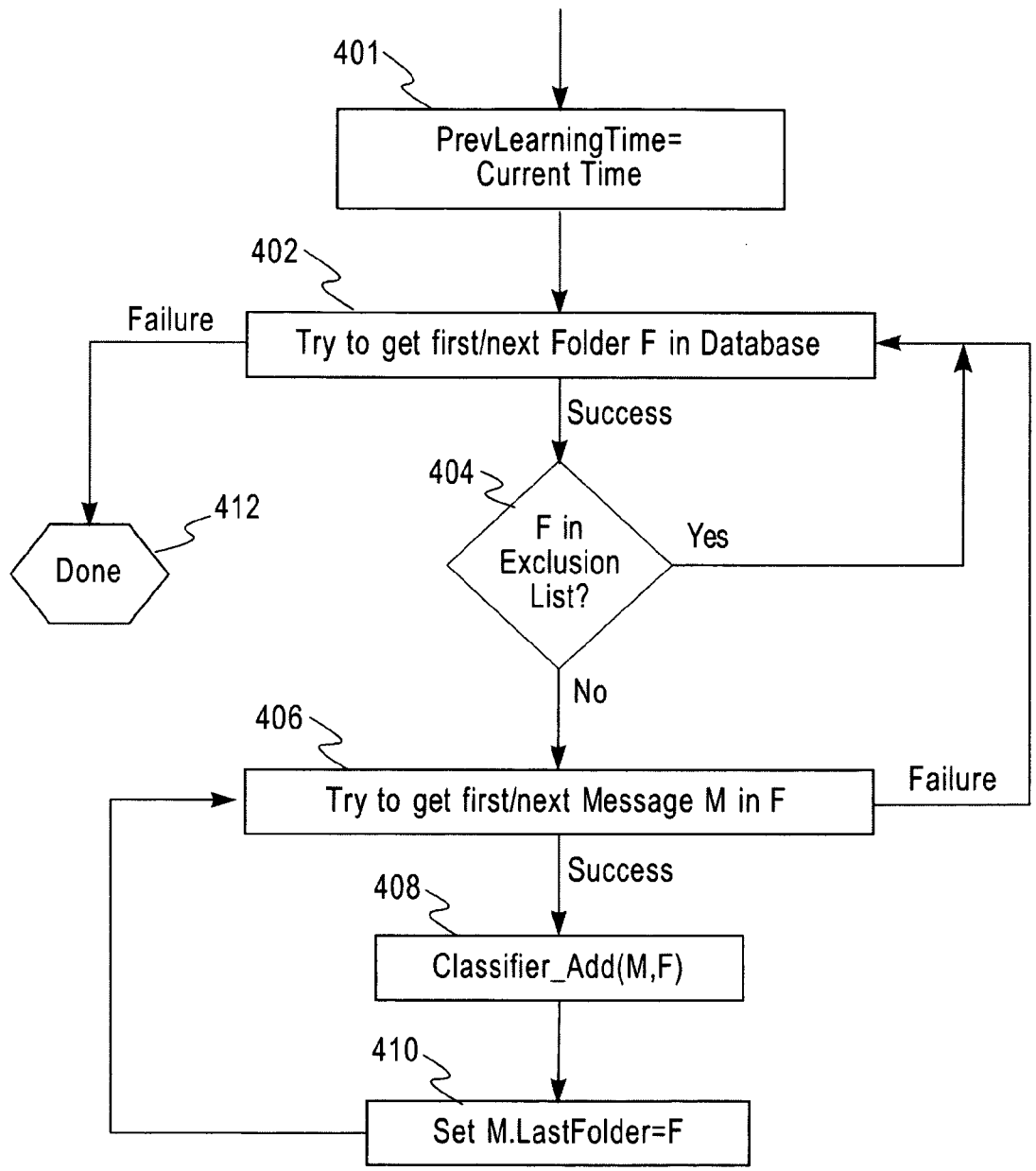
FIG. 4 is a flow diagram of the procedure by which the classifier, according to one embodiment of the present invention, is trained from scratch.

If MailCat is installed after Lotus Notes has already been in use, the mail database will most likely contain a set of folders, each of which contains several mail messages. If so, this pre-existing set of folders constitutes a corpus of labeled documents that can be used to train the classifier. At installation, or in response to the user's request for a complete refresh of the classifier, the classifier can be trained from scratch by the procedure illustrated in FIG. 4.

First, at step 401, a global variable "PrevLearningTime" is set to the current time. PrevLearningTime records the last time at which the classifier was updated. As will become clear in the discussion of incremental updates hereinbelow, this information can help reduce computational effort during the incremental updates.

At step 402, a loop over all folders in the database begins by determining the first (or next) folder F to process. If there are no folders left, the entire training-from-scratch procedure terminates at step 412. Otherwise, if F exists, it is checked at step 404 for membership in "ExclusionList," a list of names of folders that are excluded from indexing. For example, ExclusionList could contain the folders Inbox, Drafts or any others that the user wishes to exclude from automatic categorization. ExclusionList could be a default list, or a list modified or created by the user via a graphical user interface. If F is a member of ExclusionList, then the method continues to step 402, where the next folder is determined. Otherwise, at step 406, a loop begins over all messages M stored within F. At step 406, the first (or next) message M is determined, and when no such messages are left in F, the training method continues to step 402, where the loop over folders is resumed. Otherwise, if at step 406, it is determined that there is a message M to process, then the training method continues to step 408. At step 408, the procedure Classifier_Add (detailed hereinbelow) is applied to message M and folder F. Classifier_Add incorporates into the classifier the fact that message M and its contents belong to category F. At step 410, the "LastFolder" field of message M, "M.LastFolder," is set equal to F to indicate that the classifier has recorded that M belongs to category F. MailCat preferably defines and uses an extra LastFolder field for each message for tracking which category the message was in when the classifier was last updated for that message. This bookkeeping is needed for lazy incremental learning. After step 410, is the method returns to step 406 where the loop over messages continues.

Incremental Learning

Users continually receive new mail, delete old mail and move mail messages among folders. Since the contents of the folders (and the user's own conception of what messages belong in what folders) are in constant flux, it is important for the classifier to continually adapt itself, i.e. it should be capable of incremental learning.

MailCat can use two different strategies for incremental learning. The first is an "instant" strategy, in which updates to the classifier are made immediately whenever mail is added, deleted or moved. The second is a "lazy" strategy, in which some minor bookkeeping permits the updates to be deferred. As mentioned hereinabove, the bookkeeping required to support lazy learning involves defining and maintaining an extra field, "Message.LastFolder," to track which category Message was in when the classifier was last updated.

There are numerous advantages to lazy learning. On computers that are currently available, it can take a significant fraction of a second to update the classifier. Users might not tolerate an extra second of delay before viewing their next mail message. Lazy learning makes it possible to perform the classifier update during a moment when that to update is less likely to hurt performance, for example when the user's machine is relatively idle. Of potentially even greater importance than performance is that the instant learning technique demands closer integration of the automated categorizer with the mail application than does lazy learning. An automated mail categorizer that employs instant learning must be constantly vigilant for any operation taken by the mail application that results in adding, deleting or moving a message, and when any such operation occurs, it must respond immediately by updating its classifier. The need for tight communication between the categorizer and the mail application can complicate the incorporation of automated categorization into an existing mail application, making it less universal and practical than one based on lazy learning. In contrast, the use of lazy learning simplifies MailCat's integration with Lotus Notes.

The implementation of incremental learning requires either updating the classifier or performing bookkeeping operations whenever messages are added to folders, removed from folders or moved from one folder to another. These operations are handled by the MailCat_Add, MailCat_Delete, and MailCat_Move operations respectively. In addition, lazy incremental learning requires an additional procedure for processing any updates to the classifier that have been deferred. A detailed description of each of these functions under both the lazy and instant learning scenarios is given hereinbelow.

MailCat_Add

Figure 5:
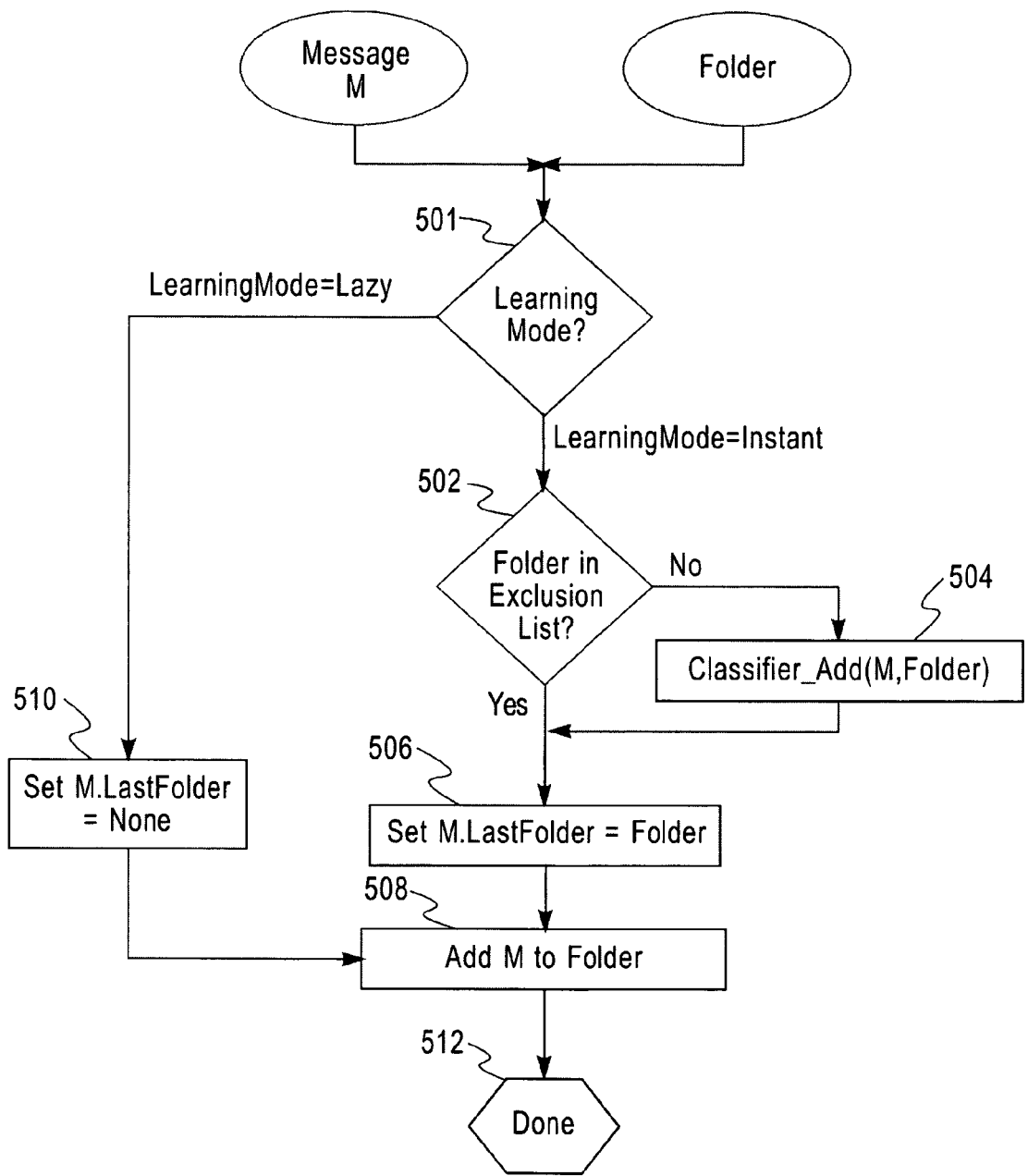
FIG. 5 is a flow diagram of the MailCat_Add procedure of one embodiment of the present invention.

The MailCat_Add procedure adds the message "M" to the folder "Folder" and simultaneously updates the classifier, if necessary. MailCat_Add is called whenever a new mail message is received and placed in a folder. Because new mail is usually placed in the Inbox, normally Folder=Inbox. FIG. 5 illustrates the process of receiving new mail into any folder. At step 501, a check is made to determine whether the "LearningMode" is "Lazy" or "Instant." If the LearningMode is Lazy, the process continues in step 510. At step 510, M's LastFolder field, M.LastFolder, is set to "None" to indicate that the message is not currently regarded by the classifier as belonging to any particular folder. Then, the process continues in step 508, where the addition of M to Folder is carried out. The process terminates at step 512. Except for the simple act of setting a field's value in the database, the system behaves exactly as it would if there were no automated categorizer. Thus, little added work is necessary to handle new incoming messages.

If, at step 501, it is determined that the LearningMode is Instant, then the process continues in step 502. At step 502, a check is made to determine whether Folder is in ExclusionList. If Folder is not a member of ExclusionList, then at step 504 the Classifier_Add function (detailed hereinbelow) is applied to M and Folder, and the process continues to step 506. Otherwise, if F is a member of ExclusionList, then application of Classifier_Add at step 504 is bypassed, and the process continues directly to step 506. At step 506, the LastFolder field of M, M.LastFolder, is set to Folder. At step 508, M is added to Folder, and the process terminates at step 512.

MailCat_Delete

Figure 6:
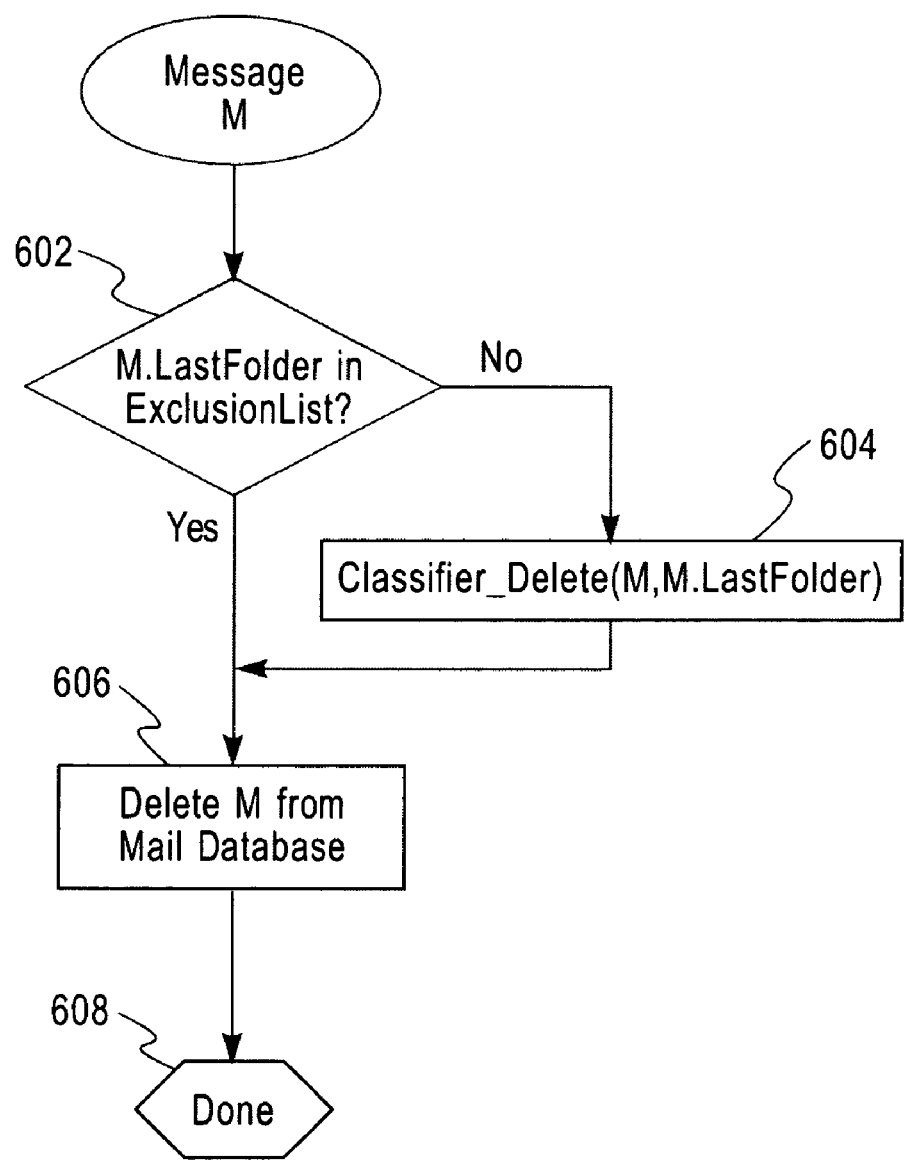
FIG. 6 is a flow diagram of the MailCat_Delete procedure of one embodiment of the present invention.

The MailCat_Delete procedure removes a message M from the database and simultaneously updates the classifier, if necessary. FIG. 6 illustrates the process. Regardless of the learning mode, the procedure begins at step 602, where it is determined whether the folder F named in the LastFolder field of message M, M.LastFolder, is in ExclusionList. If F is not a member of ExclusionList, then at step 604, the Classifier_Delete function is applied to message M. M is then deleted from the mail database at step 606. Otherwise, if F is a member of ExclusionList, then application of Classifier_Delete at step 604 is bypassed, and M is deleted from the mail database at step 606.

MailCat_Move

Figure 7:
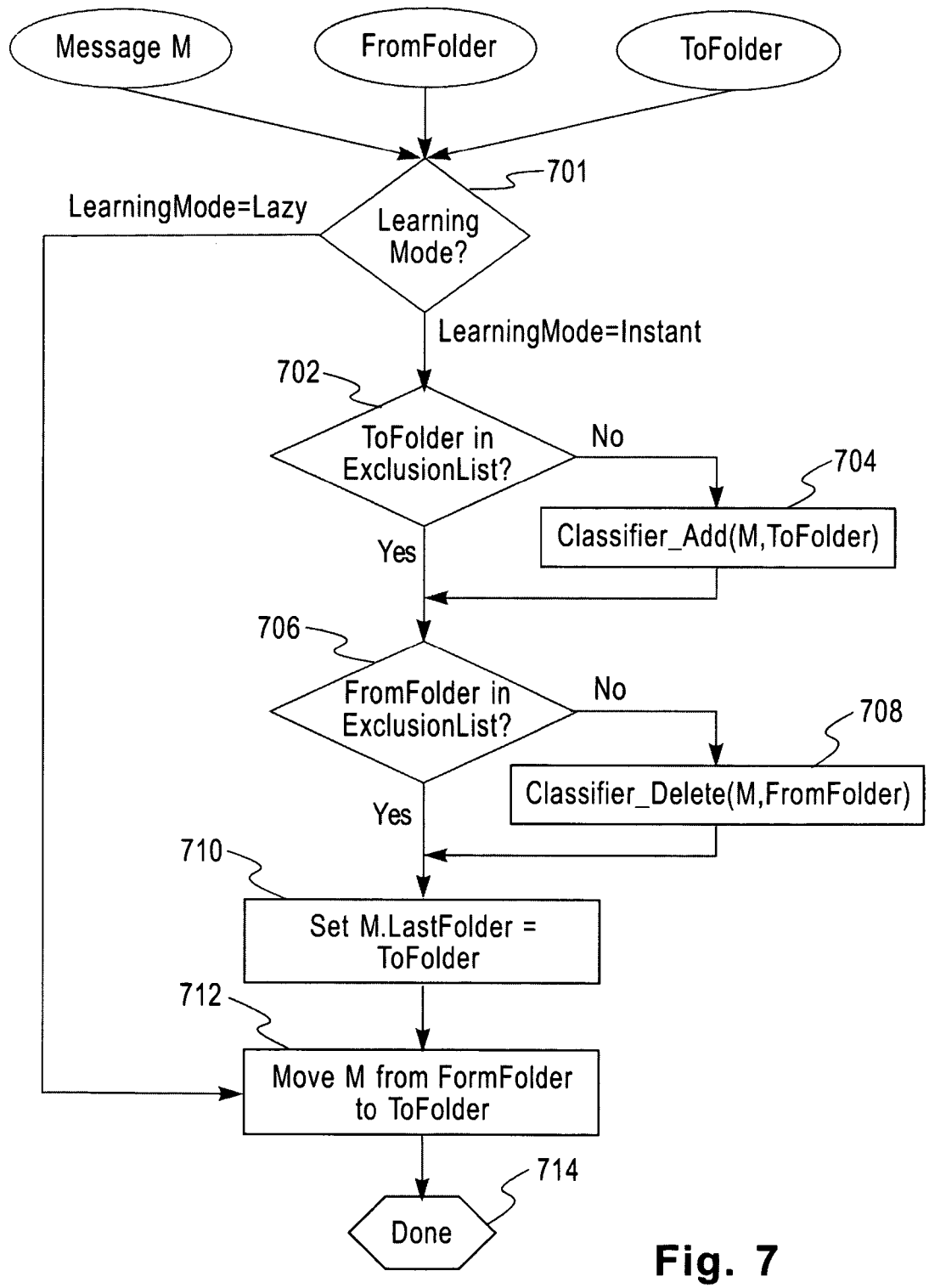
FIG. 7 a flow diagram of the MailCat_Move procedure of one embodiment of do the present invention.

The function MailCat_Move moves a message M from the folder "FromFolder" to the folder "To Folder," and simultaneously updates the classifier, if appropriate. FIG. 7 illustrates the process. At step 701, a check is made to determine whether the LearningMode is Lazy or Instant. If the LearningMode is Lazy, the process continues in step 712, where M is moved from FromFolder to ToFolder. The system behaves exactly as it would if there were no automated categorizer. In lazy learning mode, it is unnecessary to monitor the movement of messages among folders, as was highlighted hereinabove.

If, at step 701, it is determined that the LearningMode is Instant, then the process continues in step 702, where it is determined whether ToFolder is a member of ExclusionList. If ToFolder is not in ExclusionList, then at step 704, the Classifier_Add procedure is applied to the message M and the folder ToFolder, and then the process continues in step 706. Otherwise, if ToFolder is in ExclusionList, step 704 is bypassed and the process continues directly to step 706. At step 706, FromFolder is checked for membership in ExclusionList. If FromFolder is not a member of ExclusionList, then at step 708, the Classifier_Delete function is applied to message M and the folder FromFolder, and then the process continues in step 710. Otherwise, if FromFolder is a member of ExclusionList, then step 708 is bypassed and the process continues directly to step 710. At step 710, the LastFolder field of message M is set to ToFolder to indicate that the classifier (correctly) regards M as a member of the ToFolder category. Finally, at step 712, M is moved from FromFolder to ToFolder. Finally, the MailCat_Move process terminates at 714.

Incremental Learning Update for Lazy Learning

Figure 8:
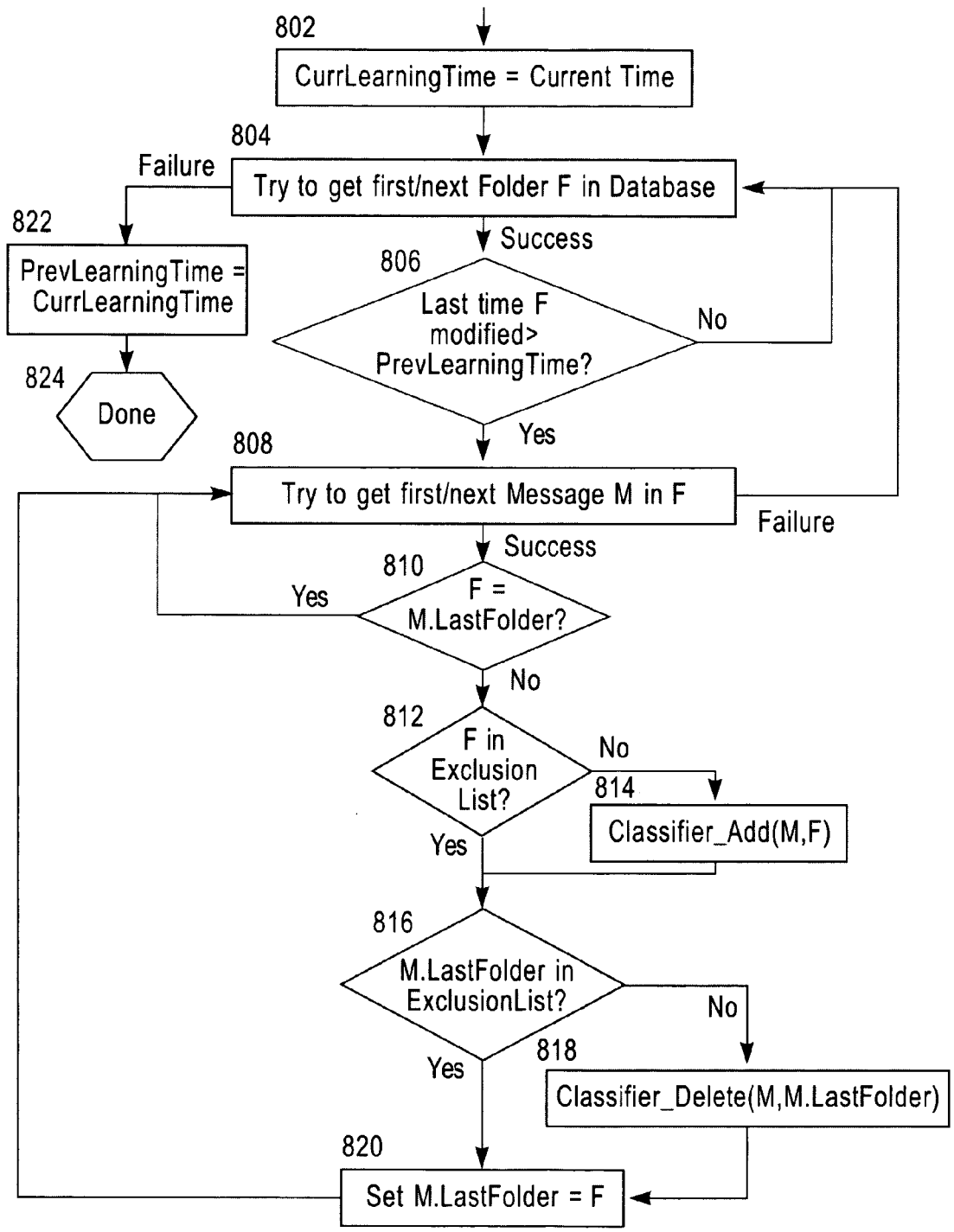
FIG. 8 is a flow diagram of the batched incremental learning update procedure of one embodiment of the present invention.

If lazy learning is being employed, then the discrepancies between the state of the database when the classifier was last trained and the current state of the database will continue to grow. At some point, a decision must be made to re-train the classifier by performing an incremental update. Several criteria can be used to determine when to trigger incremental learning. For example, a fixed amount of time (say an hour) may have passed since the last incremental update, or a threshold for the number of messages that have been added, deleted or moved may have been exceeded. Alternatively, the system may be in an idle state, so that the update can be carried out without adversely affecting performance. Regardless of the details of how or why it is triggered, the incremental learning update proceeds as illustrated in FIG. 8.

At step 802, a "CurrLearningTime" variable is set to the current time. Then, at step 804, a loop over the folders in the mail database begins by identifying the first folder F to be scanned for updates. The loop continues until all folders have been processed. When all folders have been processed, the update continues in step 822 where the variable "PrevLearningTime" is set to CurrLearningTime. The incremental update terminates at step 824.

The loop over folders in the mail database proceeds as follows. At step 806, a to test is made to determine whether PrevLearningTime (the time at which the previous incremental learning batch began) occurred before the time at which the current folder F was last modified (this information is typically available in the mail database). If the last modification to F occurred after the start of the last update, then one or more messages may have been added to F in the interim. Therefore, each message in F should be checked to see whether the classifier has already been updated with the understanding that the message is in category F, which is accomplished by continuing to step 808. Otherwise, if F was last modified before the start of the last update, then no messages in F need to be checked, and the update continues in step 804, where the next folder to process is determined.

Step 808 is the beginning of a loop over all messages in the folder F. The loop terminates when there are no messages in F that remain to be processed. At this point, control passes back to the loop over folders at step 804. Otherwise, if there is a message M to process, at step 810 M's LastFolder field, M.LastFolder, is checked to see whether it is equal to F. If so, then no updates are required on account of M, and the update continues in step 808, where the next message in F is obtained. Otherwise, if M's LastFolder field is not equal to F, then the classifier may need to be updated, and the update continues in step 812.

At 812, a check is first made to determine whether F is a member of ExclusionList. If so, the update continues in step 816. Otherwise if F is not a member of ExclusionList, then, at step 814, the Classifier_Add function (detailed hereinbelow) is applied to the message M and the folder F. At step 816, the folder F' specified in the LastFolder field of M is checked for membership in ExclusionList. If F is in ExclusionList, then the update continues in step 820. Otherwise, at step 818, the Classifier_Delete procedure (detailed hereinbelow) is applied to the message M and the folder F.

At step 820, message M's LastFolder field, M.LastFolder, is set to F. Upon the completion of step 820, the update continues in step 808, where the next message in F is obtained. Note that steps 802, 806, and 822 are introduced only for the sake of efficiency, and could be eliminated without affecting the correctness of the incremental update.

Text Classifier

The overhead of recomputing all token weights for each update is avoided in MailCat's text classifier according to the present invention by storing and retrieving token frequencies rather than token weights. Token frequencies are easier to maintain in the face of updates because adding and removing documents from a category only requires adding or subtracting the token counts for the document being updated. Token frequencies can be used for classification as follows. When the classifier is asked to classify a document, it retrieves, for each category, the frequencies for just those tokens that appear in the document. From the retrieved token frequencies, it computes the token weights for each category on the fly. The classifier then uses the dynamically generated token weights to compute the similarity of the document to each category. Since the similarity computation only requires weights for the tokens appearing in the document being compared, computing weights for the entire database can be avoided. Furthermore, the on-the-fly weight computation does not affect the computational complexity of classification. As a result, on-the-fly computation of token weights slows the classification procedure by only 10% to 20% in practice.

The MailCat classifier provides three functions to implement incremental learning: Classifier_Classify, Classifier_Add and Classifier_Delete. Classifier_Classify performs the actual classification of messages. Classifier_Add and Classifier_Delete maintain the database of token frequencies. The database of token frequencies is stored in a two-dimensional array "TokenCount[Folder, Token]." TokenCount stores, for each Token and each Folder, the number of occurrences of Token in Folder. The TokenCount array is stored as an inverted index for efficiency as described in Salton et al. In addition to its three core functions, the MailCat classifier uses the function Tokenize (Message) to generate the tokens used for classification. The following sections describe each of these functions in detail.

Tokenize(Message)

Tokenize is used by the three core classifier procedures to convert a message into a series of tokens. Tokenizing an unstructured body of text is straightforward; the text is scanned and tokens are created for each sequence of characters that forms a valid token. However, mail messages are not just flat text. Mail messages are structured documents that contain a list of headers plus the message body. The headers contain information about the message such as the message sender, the message recipients and the message subject.

A mail message can be tokenized by individually tokenizing each of its headers and the message body and then combining the resulting tokens into a single token set. However, it is useful to distinguish between header tokens and body tokens because a token's location can convey useful information that can be exploited by the classifier. Tokens can be distinguished using a number of techniques. One approach is to store with each token a tag indicating the location in which the token appears.

Rather than storing tags as separate entities, the present invention preferably distinguishes tokens by prefixing each header token with the name of its header. For example, the From header "Richard Segal" is converted to the two tokens "From:Richard" and "From:Segal." The Subject header is a special case because its contents could equally well be regarded as a message header or as part of the message body. As a result, two separate sets of tokens are generated for the Subject header, one with the "Subject:" prefix and one without. Thus, subject of "Patent draft" is converted to the tokens "Subject:patent," "Subject:draft," "patent" and "draft."

Figure 9:
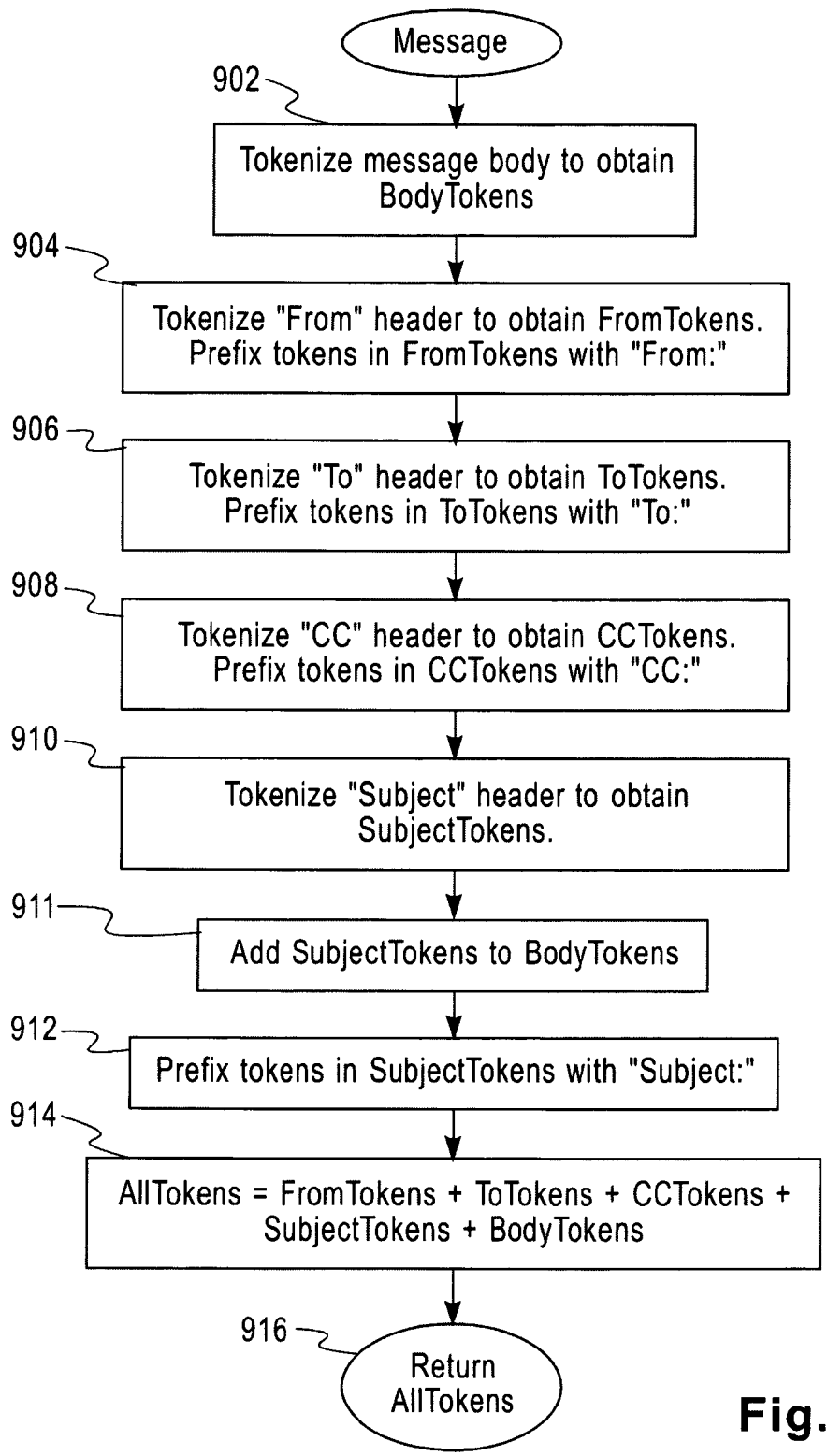
FIG. 9 a flow diagram of the procedure by which messages are tokenized prior to further processing by one of the core classifier procedures of one embodiment of the present invention.

FIG. 9 is a flowchart of the process of tokenizing a message. First, in step 902, the body of a received message is tokenized. Next, in step 904, the From header is tokenized and the string "From:" is prefixed to each token. Steps 906 and 908 perform the identical operation for the To and CC headers. Step 910 tokenizes the subject headers, but does not add the "Subject" prefix to them. Instead, "SubjectTokens" is added as is to "BodyTokens" in step 911. This ensures that the unprefixed subject tokens appear in the final token list. Then, step 912 adds the "Subject:" prefix to the subject tokens so that they will also appear prefixed in the final tokenization. Finally, step 914 combines the tokens for each of the headers and the tokens for the message body into a single set called "AllTokens." Tokenize ends in step 916 by returning AllTokens as its final output.

Classifier_Classify(Message)

Classifier_Classify uses the information stored in TokenCount to predict the MaxButtons most likely folders into which the user will place the Message. The prediction is made by comparing the token frequencies in the Message to the token frequencies in each of the folders and selecting the number of folders equal to the number of MaxButtons with the most similar token frequencies.

Figure 10:
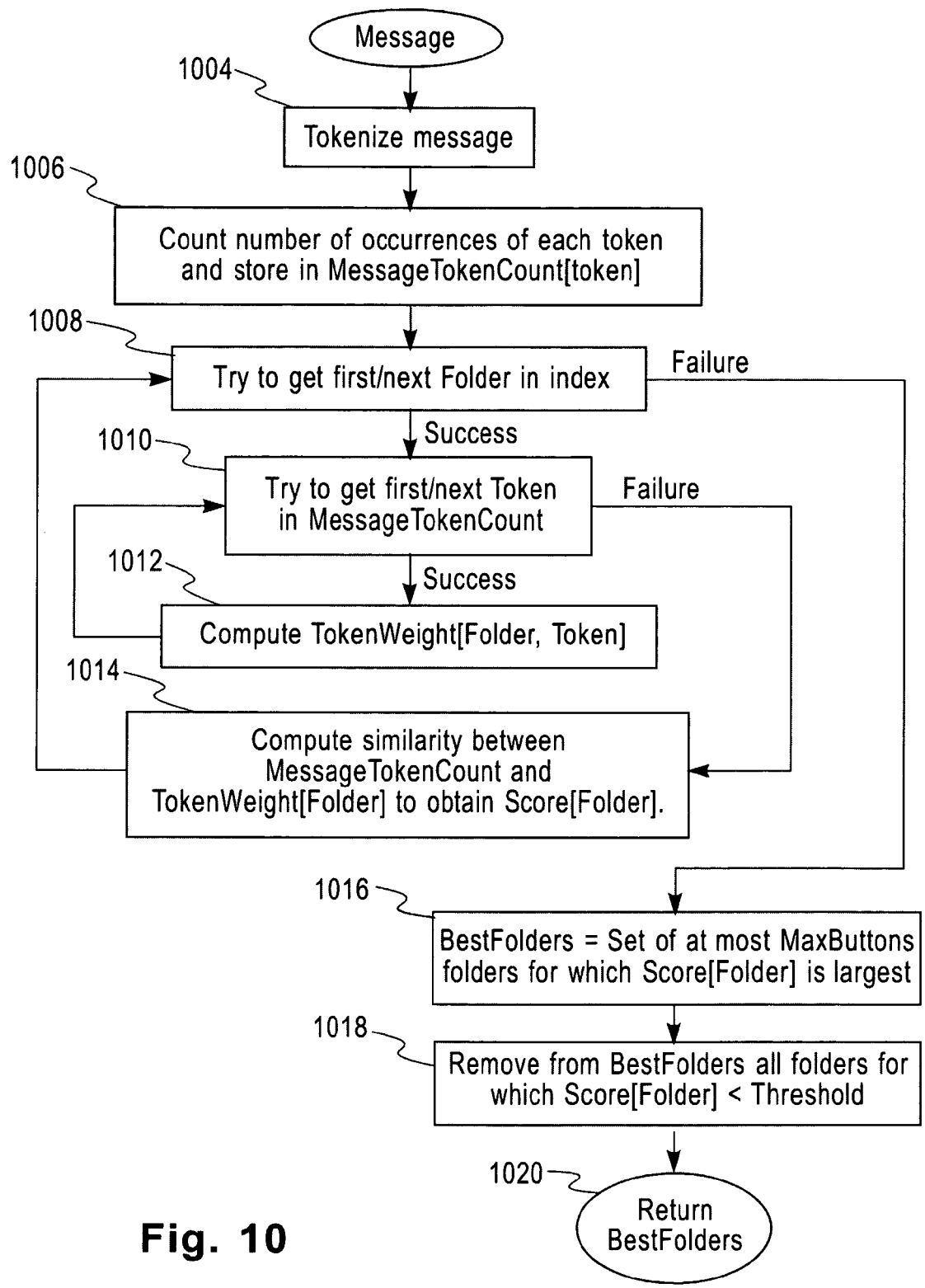
FIG. 10 is a flow diagram of the Classifier_Classify procedure of one embodiment of the present invention.

FIG. 10 is a flowchart for Classifier_Classify. The process begins in step 1004, where the Message is tokenized as described hereinabove. In step 1006, the number of occurrences of each token is tallied, and the results are stored in "MessageTokenCount." Steps 1008 through 1018 implement a loop that iterates over all folders in the index and computes a similarity score between MessageTokenCount and the token weights for each folder.

At step 1008, the first (or next) Folder in the iterated loop over folders is obtained. If there are no more folders, then the method continues out of the loop to step 1016. Otherwise, at step 1010, a loop begins over all tokens in MessageTokenCount. For each Token, a weight is computed and stored as "TokenWeight[Folder, Token]" at step 1012. When there are no more tokens in MessageTokenCount, the method continues out of the loop over tokens to step 1014. Step 1014 computes the similarity between the token counts in MessageTokenCount and the token weights in TokenWeight[Folder] and stores the results in Score[Folder].

When the iterated loop over folders terminates, the method continues in step 1016, where the MaxButtons folders with the largest value of Score[Folder] are selected and stored in the list BestFolders. Next, at step 1018, the score for each folder in BestFolders, preferably, is compared with a default or user-selected threshold. Any folder for which Score[Folder] is less than the threshold is removed from BestFolders. Finally, at step 1020, BestFolders is returned as the classifier's final predictions.

Classifier_Add(Message,Folder)

Classifier_Add updates TokenCount to reflect that the message Message has been placed in folder Folder. The update is performed by updating the frequency counts for Folder to include the tokens in Message.

Figure 11:
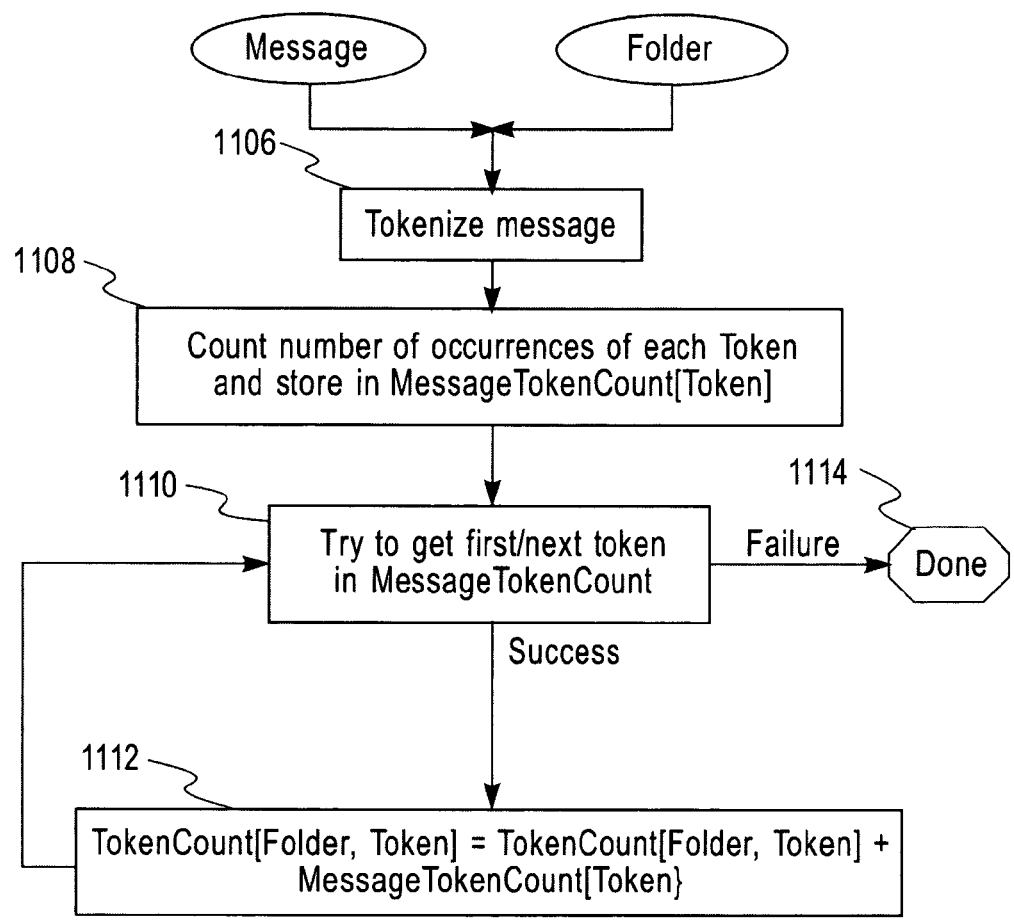
FIG. 11 is a flow diagram of the Classifier_Add procedure of one embodiment of the present invention.

FIG. 11 is a flowchart for Classifier_Add. First, in step 1106, the message is tokenized as described as described hereinabove. Step 1108 counts the number of occurrences of each token in Message and stores the tally for each Token in MessageTokenCount[Token]. Steps 1110 and 1112 loop through the tokens in MessageTokenCount to update TokenCount. At step 1110, the first (or next) Token in MessageTokenCount is selected. While there are more tokens to be processed, step 1112 increments TokenCount[Folder, Token] by MessageTokenCount[Token]. The procedure then continues back to step 1110 to continue the loop. When there are no more tokens remaining to be processed, Classifier_Add terminates at step 1114.

Classifier_Delete(Message,Folder)

Classifier_Delete updates TokenCount to reflect that the message Message has been placed in folder Folder. The update is performed by updating the frequency counts for Folder to remove the tokens in Message.

Figure 12:
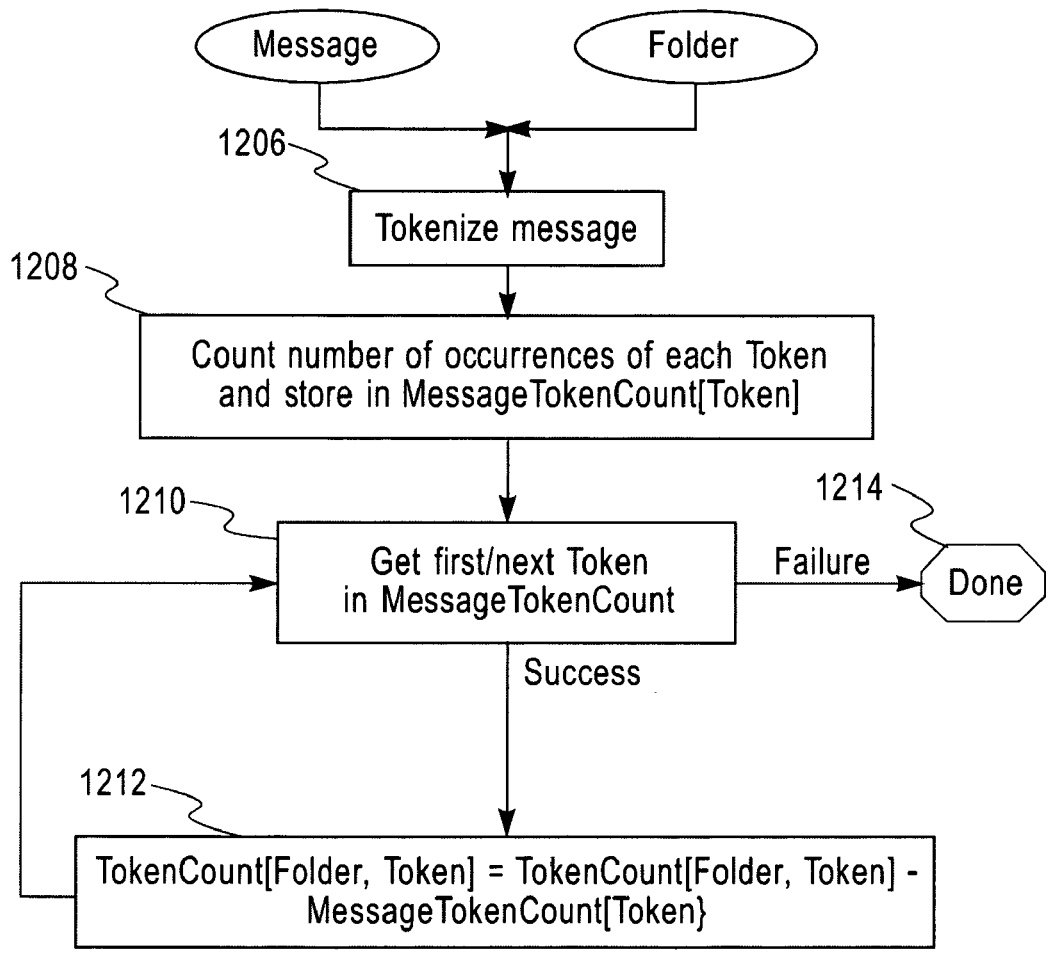
FIG. 12 is a flow diagram of the Classifier_Delete procedure of one embodiment of the present invention.

FIG. 12 is a flowchart for Classifier_Delete. First, in step 1206, the message is tokenized as described hereinabove. Step 1208 counts the number of occurrences of each token in Message and stores the tally for each Token in MessageTokenCount[Token]. Steps 1210 and 1212 loop through the tokens in MessageTokenCount to update TokenCount. At step 1210, the first (or next) Token in MessageTokenCount is selected. While there are more tokens to be processed, step 1212 decrements TokenCount[Folder, Token] by MessageTokenCount[Token]. The procedure then continues back to step 1210 to continue the loop. When there are no more tokens remaining to be processed, Classifier_Delete terminates at step 1214.

A Web Browser Bookmark Assistant

Another embodiment of the present invention augments a standard web browser to simplify the process of organizing bookmarks, which are pointers to web pages. A web browser is a program for viewing web pages published on the internet. A common feature in web browsers is the ability to bookmark frequently accessed pages. Bookmarks are internet addresses that the browser remembers for future quick access. The browser provides an interface for viewing and manipulating bookmarks. Any page that has been added to the bookmarks can be quickly viewed by requesting the bookmark list and clicking on the page's title.

Most browsers allow the user to organize bookmarks into a hierarchy of folders. This hierarchy simplifies locating specific bookmarks. The task of organizing bookmarks into a hierarchy is almost identical to the task of organizing mail messages into a hierarchy. As a result, with only a few changes in detail, the same basic methods of the present invention presented hereinabove for organizing mail messages apply equally well to the task of organizing bookmarks.

One embodiment of the bookmark assistant operates as follows. When the user desires to create a bookmark for the web page currently being viewed, MailCat_Classify runs with the web page taken as the message input. ShortcutMode is set to EnhanceMenu, in which case the user views a menu of possible bookmark folders consisting of a set of the to most likely folders prepended to a full alphabetical listing of all bookmark folders. The user selects a folder, and the bookmark is placed in that folder. Classifier updates are handled substantially as described in the description of MailCat, with either instant or lazy learning being supported. However, there are several alterations to the MailCat embodiment that are required to create an automated assistant for organizing bookmarks.

The first required change stems from structural differences between web pages and mail messages that affect tokenization. A web page could be tokenized by simply reading the contents of a page and forming tokens for each token found in the input. However, just as mail messages contain structured header information, web pages contain some structured elements that may be useful to distinguish from the main body of the text and from one another. These structured elements differ in detail from those found in mail messages, but the tokenization appropriate to web pages is generally similar in structure to that detailed in the tokenization procedure shown in FIG. 9.

A second required change to the above-described MailCat embodiment is due to the fact that the contents of a typical web page can change at any time. The changing contents of web pages make it impossible to keep the TokenCount database completely accurate. Minor inaccuracies in TokenCount should not significantly affect classification performance because the topic of a web page usually remains the same even when the actual text changes. However, the impact on Classifier$_{13}$ Delete, which is invoked whenever bookmarks are deleted or moved, is much more severe. The function of Classifier$_{13}$ Delete(Message, Folder) is to decrement TokenCount[Folder, Token] appropriately for each Token in a Message. The intent is to neutralize the increment that was originally made to TokenCount[Folder, Token] when Message was first placed in Folder. However, since the contents of the Message (the web page pointed to by the bookmark in question) may have changed, it is possible that the message text passed to Classifier_Delete will differ from what was originally passed to Classifier_Add.

This problem can be handled in a number of ways. One approach is to make Classifier_Delete a null function that does not change TokenCount. This approach prevents the token counts of deleted messages from being removed. If a bookmark is originally placed in the correct folder, and is later removed entirely from the collection of bookmarks, the tokens that it leaves behind in the index will still be useful because they reinforce the classifier's understanding of what constitutes membership in the folder. On the other hand, if a bookmark is accidentally placed in the wrong folder and then removed, the tokens left behind will skew the token distributions in such a way as to reduce the accuracy of the classifier. This problem can be partially alleviated by periodically refreshing the index by training from scratch.

A second approach is to store the token counts of each message in a two-dimensional array "PageTokenCount[WebAddress, Token]." This array provides the token counts needed to delete a message. This approach requires a large amount of additional storage space to maintain PageTokenCount. However, PageTokenCount is already required for systems implementing full-text searching of bookmarks. Therefore, maintaining PageTokenCount requires no extra storage in these instances.

The use of PageTokenCount requires that whenever a bookmark is created, its tokens are placed in PageTokenCount. Once this is done, any step that previously required to counting the tokens in a message can now be implemented using PageTokenCount rather than directly performing the tokenization. For instance, the two steps of Classifier_Add and Classifier_Delete that tokenize the message and count tokens can be removed if the step that updates TokenCount uses PageTokenCount rather than MessageTokenCount.

A third change to the above-described MailCat embodiment that is required to create an automated assistant for organizing bookmarks is due to the fact that bookmarks are links to web pages, not web pages themselves. Whenever the contents of a web page are needed to update the classifier, an extra step must be added to fetch its contents over the network. Fetching a page over the network also requires addition steps to handle web pages that cannot be accessed. Thus, it is preferable to use lazy learning which is the simplest approach to handling these potential access failures. Any time a page cannot be accessed, the message's LastFolder field is set to ensure that the proper action occurs in the future.

A fourth required change to the above-described MailCat embodiment is due to the fact that bookmarks are created in a different manner than mail messages. Most browsers support an "Add Bookmark" button that creates a new bookmark for the current page. The new bookmark is created in either the top-level folder or in some specially designated folder for new entries. This folder, whatever it is called, serves a function analogous to that of the Inbox folder in mail processing. The implementation of the automated bookmark organizer must be modified to use this special folder in place of the Inbox.

Bookmarks also can be created and placed directly in folders. This usually occurs by pressing a "File Bookmark" button that brings up a dialog menu to select a destination folder. It also could occur by adding buttons to bookmark the folder directly into specific folders. For example, it is straightforward to add buttons such as "File Bookmark in Baseball" and "File Bookmark in Football." The ability to directly add a bookmark to the folder creates the possibility of predicting the destination folder for new pages. As a result, the method for producing shortcut buttons and shortcut menu items described hereinabove could be applied to each web page the browser visits.

Now that the invention has been described by way of a preferred embodiment, various modifications and improvements will occur to those of skill in the art. For instance, in addition to textual documents, the present invention can be used to assist a user in organizing non-textual electronic documents such as images (which could be stored in any format, such as JPEG, GIF or TIFF), video clips (which could be stored in any format, such as MPEG or AVI), or audio clips (which could be stored in any format, such as WAV). Just as in the other embodiments described hereinabove, the classifier can be trained from a pre-existing labeled document collection, and could be updated incrementally as the user uses the invention to organize documents. One skilled in the art would appreciate that the classification method (using tokenization) described hereinabove can apply equally to the non-textual environment. Thus, it should be understood that the preferred embodiment is provided as an example and not as a limitation. The scope of the invention is defined by the appended claims.

We claim:

1. An automated method of assisting a user with the task of categorizing electronic documents into a collection, comprising the steps of:
classifying, with a classifier, a document to obtain a plurality of most likely categorical labels;
deriving a plurality of categorizations shortcuts from the plurality of most likely categorical labels;
displaying, to the user, a representation of the plurality of most likely categorical labels;
receiving, from the user, a selection of one or more of the most likely categorical labels representative of the document to be categorized within a collection;
labeling the document within the collection with one or more of the selected categorical labels; and
incrementally retraining the classifier to adapt to modifications of the collection, wherein the incremental retraining is performed using a lazy strategy for incrementally retraining the classifier.

2. The method of claim 1 wherein the classifying step comprises the step of classifying, upon receipt into data storage, the document to obtain the plurality of most likely categorical labels.

3. The method of claim 1 wherein the deriving step comprises the step of deriving, upon receipt of the document into data storage, categorization shortcuts from the plurality of most likely categorical labels.

4. The method of claim 1 wherein the deriving step comprises the step of labeling display buttons with the plurality of most likely categorical labels, and the displaying step comprises the step of displaying the labeled display buttons with the document.

5. The method of claim 1 wherein the deriving step comprises the step of creating an ordered set of the plurality of most likely categorical labels, and the displaying step comprises the step of displaying with the document the ordered set prepended to a standard ordered set of other categorical labels.

6. The method of claim 1 wherein the classifying step occurs substantially simultaneously with the displaying step.

7. The method of claim 1 wherein the classifying step comprises the step of classifying upon invocation by the user, the document to obtain the plurality of most likely categorical labels.

8. The method of claim 7 wherein the invocation comprises a selection by the user of a classify button.

9. The method of claim 1 wherein the labeling step comprises the step of storing the document in folders or locations of the collection corresponding to the one or more selected categorical labels.

10. The method of claim 9, wherein the classifying step comprises the steps of:
tokenizing the document into different tokens;
tallying a number of occurrences of each token in the document;
computing, for each folder, a token weight of each token;
comparing, for each token, the number of occurrences and the token weights;
creating a similarity score in response to the comparing step; and
identifying a subset of folders for which the similarity score is highest.

11. The method of claim 10 further comprising the step of removing, from the identified subset, all folders from which the similarity score is lower than a default or specified threshold.

12. The method of claim 10, wherein the computing step comprises the step of computing the token counts of each token in each of the folders.

13. The method of claim 10 wherein the tokenizing step comprises the steps of:
separately tokenizing different portions of the document; and
labeling the tokens according to the different portions.

14. The method of claim 1 further comprising the step of displaying a standard list of all categorical labels, wherein the receiving step comprises the step of receiving, from the user, data representative of one or more selected categorical labels from either the plurality of displayed categorization shortcuts or the standard list.

15. The method of claim 1 wherein the retraining step comprises the step of retraining the classifier in response to the labeling step.

16. The method of claim 1 wherein the labeling step comprises the step of storing the document in folders or locations of the collection corresponding to the one or more selected categorical labels and the retraining step comprises the steps of:
receiving, from the user, addition data representative of an addition of a document into a tofolder; and
retraining the classifier in response to the addition data.

17. The method of claim 16 wherein the retraining step comprises the step of assigning, in the classifier, the added document to the tofolder.

18. The method of claim 17 further comprising the step of identifying excluded folders to be excluded from retraining and wherein the retraining step comprises the step of assigning, in the classifier, the added document when the tofolder is not one of the identified excluded folders.

19. The method of claim 17 wherein the classifying step comprises the steps of:
tokenizing the document into different tokens;
tallying a number of occurrences of each token in the document;
retrieving, for each folder, a tokencount of each token;
computing, for each folder, a token weight of each token;
comparing, for each token, the number of occurrences and the token weights;
creating a similarity score in response to the comparing step; and
identifying a subset of folders for which the similarity score is highest, and wherein the assigning step comprises the step of adding the number of occurrences of each token to the tokencount of the tofolder.

20. The method of claim 19 wherein the electronic document is web page and the collection is a collection of bookmarks, the method further comprising the step of storing, for each web page, a pagetokencount matching the tallied number of occurrences of each token.

21. The method of claim 1 wherein the labeling step comprises the step of storing the document in folders or locations of the collection corresponding to the one or more selected categorical labels and the retraining step comprises the steps of:

receiving, from the user, deletion data representative of a removal of a document from a from folder; and retraining the classifier in response to the deletion data.

22. The method of claim 21 wherein the retraining step comprises the step of unassigning, in the classifier, the removed document from the from folder in which it was categorized.

23. The method of claim 22 further comprising the step of identifying excluded folders to be excluded from retraining and wherein the retraining step comprises the step of unassigning, in the classifier, the removed document when the from folder is not one of the identified excluded folders.

24. The method of claim 22 wherein the classifying step comprises the steps of:
- tokenizing the document into different tokens;
- tallying a number of occurrences of each token in the document;
- retrieving, for each folder, a tokencount of each token;
- computing, for each folder, a token weight of each token;
- comparing, for each token, the number of occurrences and the token weights;
- creating a similarity score in response to the comparing step; and
- identifying a subset of folders for which the similarity score is highest, and wherein the unassigning step comprises the step of subtracting the number of occurrences of each token to the tokencount of the tofolder.

25. The method of claim 24 wherein the electronic document is a web page and the collection is a collection of bookmarks, the method further comprising the step of storing, for each web page, a pagetokencount matching the tallied number of occurrences of each token, wherein the unassigning step comprises the step of subtracting the pagetokencount from the tokencount of the fromfolder.

26. The method of claim 1 wherein the labeling step comprises the step of storing the document in folders or locations of the collection corresponding to the one or more selected categorical labels and the retraining step comprises the steps of:
- receiving, from the user, move data representative of a movement of a document from a source folder to a destination folder; and
- retraining the classifier in response to the move data.

27. The method of claim 26 wherein the retraining step comprises the steps of:
- unassigning, the classifier, the moved document from the source folder in which it was categorized; and
- assigning, in the classifier, the moved document to the destination folder.

28. The method of claim 27 further comprising the step of identifying excluded folders to be excluded from retraining and wherein the retraining step comprises the steps of:
- unassigning, in the classifier, the moved document when the source folder is not one of the identified excluded folders; and
- assigning, in the classifier, the moved document when the destination folder is not one of the identified excluded folders.

29. The method of claim 27 wherein the classifying steps comprises the steps of:
- tokenizing the document into different tokens;
- tallying a number of occurrences of each token in the document;
- retrieving, for each folder, a tokencount of each token;
- computing, for each folder, a token weight of each token;
- comparing, for each token, the number of occurrences and the token weights;
- creating a similarity score in response to the comparing step; and
- identifying a subset of folders for which the similarity score is highest, and wherein the unassigning step comprises the step of subtracting the number of occurrences of each token from the tokencount of the source folder, and the assigning step comprises the step of adding the number of occurrences of each token to the tokencount of the destination folder.

30. The method of claim 29 wherein the electronic document is a web page and the collection is a collection of bookmarks, the method further comprising the step of storing, for each web page, a pagetokencount matching the tallied number of occurrences of each token, wherein the unassigning step comprises the step of subtracting the pagetokencount from the tokencount of the fromfolder.

31. The method of claim 1 wherein the retraining step occurs immediately after a collection modification.

32. The method of claim 1, further comprising the step of training the classifier from scratch with a pre-existing collection of categorized documents.

33. The method of claim 32 wherein the labeling step comprises the step of storing the document in folders or locations of the collection corresponding to the one or more selected categorical labels and the training step comprises the step of assigning, in the classifier, each of the pre-existing documents to a folder in which it is categorized.

34. The method of claim 33 wherein the classifying step comprises the steps of:
- tokenizing the document into different tokens;
- tallying a number of occurrences of each token in the document;
- retrieving, for each folder, a tokencount of each token;
- computing, for each folder, a token weight of each token;
- comparing, for each token, the number of occurrences and the token weight;
- creating a similarity score in response to the comparing step; and
- identifying a subset of folders for which the similarity score is highest, and wherein the assigning step comprises the step of adding the number of occurrences of each token to the tokencount of the tofolder.

35. The method of claim 33 further comprising the step of identifying excluded folders to be excluded from training and wherein the training step comprises the step of assigning, in the classifier, each of the pre-existing documents, except those in the identified excluded folders.

36. The method of claim 1 wherein the labeling step comprises the step of storing the document in folders or locations of the collection corresponding to the one or more selected categorical labels and the re-training step comprises the steps of:
- determining a time of a last step of retraining; and
- retraining the classifier on each folder which was modified after the determined time.

37. The method of claim 1 wherein labeling step comprises the step of storing the document in folders or locations of the collection corresponding to the one or more selected categorical labels, the method further comprising the step of training the classifier from scratch with a pre-existing collection of categorized documents, wherein the retraining step comprises the steps of:
- determining a time of the step of training or a last step of re-training; and
- retraining the classifier on each folder which was modified after the determined time.

38. The method of claim 1 wherein the classifying step uses the TF-IDF principle.

39. The method of claim 1 wherein the electronic document is an e-mail message.

40. The method of claim 1 wherein the electronic document is web page and the collection is a collection of bookmarks.

41. The method of claim 1 wherein the electronic document is a multimedia document.

42. The method of claim 41 wherein the multimedia document is an image file, a video file or an audio file.

43. The method of claim 42 wherein the multimedia document further includes text.

44. The method of claim 41 wherein the multimedia document combines any combination of text, an image file, a video file and an audio file.

45. The method of claim 1 wherein the electronic document comprises data sets that are not viewable in their entirety, but can be categorized in response to some presentation to the user.

46. The method of claim 1 wherein:
the step of displaying most likely categorical labels to the user further comprises displaying through a graphical user interface a plurality of virtual category buttons, each labeled with one of the categorical labels;
the step of receiving representative data from the user comprises receiving information that one of the category buttons has been selected by the user by clicking on the category button; and
the step of labeling the document comprises virtually moving the document to a virtual file folder unique to the categorical label selected, and occurs upon the clicking of the selected category button without need for any other activity by the user.

47. The automated method of claim 1, wherein the incrementally retraining is performed using a lazy strategy for incrementally retraining the classifier comprises:
deferring retraining of the classifier;
performing bookkeeping operations whenever messages are added to folders, removed from folders, or moved from one folder to another; and
automatically triggering retraining of the classifier by a predetermined criteria, wherein the retraining the classifier by processing any updates that have been deferred.

48. The automatic method of claim 47, wherein the predetermined criteria for automatically performing the retraining step is a fixed amount of time that has elapsed since a last retraining step has been performed.

49. The automatic method of claim 47, wherein the predetermined criteria for automatically performing the retraining step is when a threshold number of documents have been added, deleted, or moved in the collection and any combination thereof.

50. The automatic method of claim 47, wherein the predetermined criteria for automatically performing the retraining step is when the system has reached an idle state or is either updating the classifier or performing bookkeeping operations whenever messages are added to folders, removed from folders, or moved from one folder to another.

51. The automatic method of claim 1, wherein incremental retraining the classifier includes an instant strategy for incrementally retraining the classifier.

52. A program storage device, readable by a machine, tangibly embodying a program of instructions executable by the machine to perform method steps for automatically assisting a user with the task of categorizing an electronic document into a collection, the method comprising the steps of:
classifying, with a classifier, a document to obtain a plurality of most likely categorical labels;
deriving a plurality of categorizations shortcuts from the plurality of most likely categorical labels;
displaying, to the user, a representation of the plurality of most likely categorical labels;
receiving, from the user, a selection of one or more of the most likely categorical labels representative of the document to be categorized within a collection;
labeling the document within the collection with one or more of the selected categorical labels; and
incrementally retraining the classifier to adapt to modifications of the collection, wherein the incremental retraining is performed using a lazy strategy for incrementally retraining the classifier.

53. The program storage device of claim 52 wherein:
the step of displaying most likely categorical labels to the user further comprises displaying through a graphical user interface a plurality of virtual category buttons, each labeled with one of the categorical labels; and
the step of receiving representative data from the user comprises receiving information that one of the category buttons has been selected by the user by clicking on the category button; and
the step of labeling the document comprises virtually moving the document to virtual file folder unique to the categorical label selected, and occurs upon the clicking of the selected category button without need for any other activity by the user.

* * * * *